United States Patent
Furman et al.

(10) Patent No.: US 7,137,253 B2
(45) Date of Patent: Nov. 21, 2006

(54) METHOD AND APPARATUS FOR ACTIVELY TURBOCHARGING AN ENGINE

(75) Inventors: Anthony Holmes Furman, Scotia, NY (US); Roy James Primus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/942,221

(22) Filed: Sep. 16, 2004

(65) Prior Publication Data

US 2006/0053788 A1 Mar. 16, 2006

(51) Int. Cl.
*F02B 33/44* (2006.01)
*F02B 37/00* (2006.01)
*B60K 6/04* (2006.01)

(52) U.S. Cl. .......................................... 60/608; 60/597

(58) Field of Classification Search ................ 60/608, 60/607, 609, 597; *F02B 37/00*
See application file for complete search history.

(56) References Cited

U.S. PATENT DOCUMENTS

| | | | | |
|---|---|---|---|---|
| 4,850,193 | A | 7/1989 | Kawamura | 60/608 |
| 5,771,868 | A | 6/1998 | Khair | 60/609 |
| 5,906,098 | A * | 5/1999 | Woollenweber et al. | 60/608 |
| 6,415,606 | B1 | 7/2002 | Bowman et al. | 60/608 |
| 6,637,205 | B1 * | 10/2003 | Ahmad et al. | 60/608 |
| 6,705,084 | B1 * | 3/2004 | Allen et al. | 60/608 |
| 6,880,337 | B1 * | 4/2005 | Masuda | 60/608 |
| 2004/0216457 | A1 * | 11/2004 | Shea et al. | 60/608 |

FOREIGN PATENT DOCUMENTS

JP 2004251240 A * 9/2004

* cited by examiner

*Primary Examiner*—Thai-Ba Trieu
(74) *Attorney, Agent, or Firm*—Fletcher Yoder

(57) ABSTRACT

A technique comprising an apparatus for monitoring at least one operating parameter indicative of an operating condition of a diesel engine and controlling a turbocharger assist device to maintain desired operating conditions of the diesel engine equipped with a turbocharger.

29 Claims, 4 Drawing Sheets

METHOD AND APPARATUS FOR ACTIVELY TURBOCHARGING AN ENGINE

BACKGROUND

The invention relates generally to diesel engines, and more specifically to turbocharged diesel engines.

The capability of modem engines to produce more power from a given cylinder displacement has been steadily increased due to engineering innovation and development. Modem engines utilize higher charged air pressure provided by turbochargers to generate more power than their previous generation counterparts. The amount of power obtained from a cylinder in an engine depends upon how much fuel is burned in it, and upon the amount of air available in the cylinder. Therefore, by providing more air into the cylinder the power generated is increased. Turbocharging is a technique used to increase the amount of air introduced into each cylinder, typically by a positive pressure that exceeds the then reigning pressure in the cylinder. Exhaust gas from the engine typically drives the turbocharger. This gas drives a turbine, which, in turn, drives a compressor to drive the additional air into the cylinder.

Conventional diesel engines used in vehicles, such as diesel electric locomotives are difficult to start at low ambient temperatures. In some engines, the compression ratio and cranking speed are insufficient to provide adequate in-cylinder temperature and pressure for auto ignition of the diesel fuel. One of the ways this issue has been addressed is to use auxiliary power units to circulate hot fluids through the engine for enhanced cold start capability.

Certain transients or off-design operation can lead to turbocharger surge, which is damaging to the turbo machinery and associated hardware. Locomotives currently have few or no controls or hardware to avoid such damage.

To address the surge issue, turbocharged trucks and automobiles are typically equipped with waste gate systems to limit turbocharger speed. Alternately, "safe gates" or blow off valves on the compressor discharge have been used to prevent surge. Typically, compressor surge margin can be improved through aerodynamic modifications to the compressor and diffuser, but these often result in loss of compressor efficiency.

There is a need, therefore, for an improved technique for cold-start performance of diesel engines, to prevent turbocharger surge, and to control turbocharger speed independent of engine operation. There also exists a need for a technique to increase the engine performance to address the drawbacks in heretofore known systems.

BRIEF DESCRIPTION

According to one aspect of the present technique, an apparatus is provided for regulating operating conditions of a diesel engine. The apparatus comprises a controller configured to receive signals including at least one operating parameter of the diesel engine. The controller also generates a control signal to operate a turbocharger configured to be driven by exhaust gas from the engine. The apparatus also comprises a turbocharger assist device coupled to the controller, configured to add work to the turbocharger or subtract work from the turbocharger based on the control signal.

In another embodiment of the present invention, a method is provided for generating a plurality of control signals in response to operating conditions of the diesel engine. The control signals serve to control a turbocharger assist device to maintain desired operating conditions of the diesel engine. The operating conditions may include, for example, the limiting of in-cylinder pressure, the avoidance of compressor surge, and the limiting of maximum turbocharger speed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
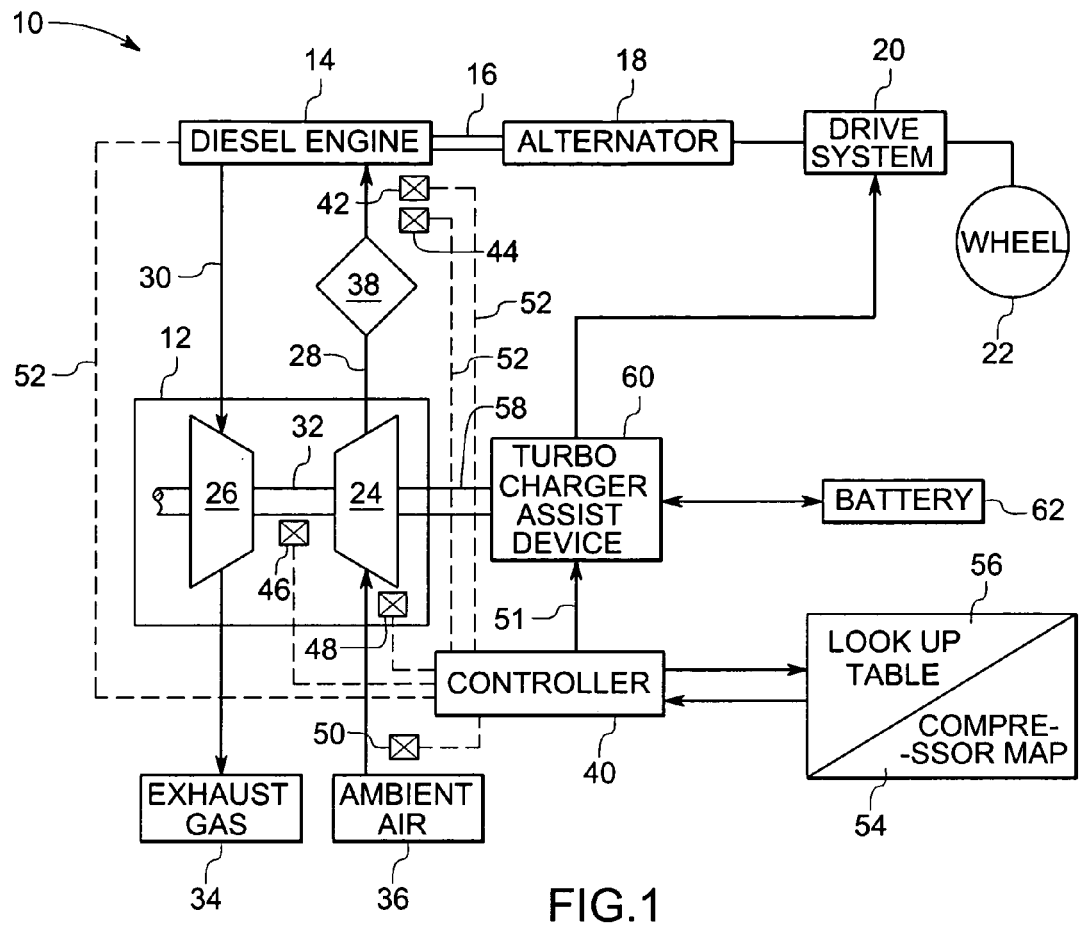
FIG. 1 is a diagrammatical view illustrating exemplary functional components of a turbocharger in accordance with aspects of the present technique.

Turning now to the drawings, and referring first to FIG. 1, a diagrammatical view of exemplary functional components of a turbocharging system 10 including a turbocharger 12 is illustrated. The arrangement illustrated in FIG. 1 includes a diesel engine 14 having a drive shaft 16 coupled to a generator or alternator 18. The alternator 18 provides electric power to one or more traction motors (not shown in the figure for clarity) for propelling a vehicle in which the engine and motors are disposed, such as a locomotive, work vehicle, and so forth. The alternator 18 is coupled to a drive system 20, which drives the wheels 22 of the locomotive or vehicle. It should be noted that, although reference is made in the present description to a vehicle drive system, and more particularly to a locomotive drive system, the present technique might find application outside of such environments, including in stationary engine drive systems, such as generator sets, and so forth.

The turbo-charger 12 includes a compressor 24 and a turbine 26. The compressor is operable to provide a supply of compressed air to an intake manifold 28 for combustion in the diesel engine 14. The turbine 26 is connected to an exhaust manifold 30 for extracting energy from the exhaust gases of the engine for rotating a turbocharger shaft 32 connected to the compressor 24. The waste gases of the engine 14 flow out as exhaust gas 34 from the engine. The compressor 24 draws ambient air 36 through a filter (not illustrated in the figures for clarity) and provides compressed air through an outlet connected to a heat exchanger 38. The air is heated to an elevated temperature by compression, and is passed through heat exchanger 38 such that the temperature of air is reduced prior to delivery into the engine 14.

Turbocharger 12 is a type of forced induction system compressing the air flowing into the engine 14. Compressing the air advantageously permits the engine 14 to force additional air into the cylinders of the engine 14. The additional air so obtained enables more fuel being added to the engine 14, which is combined with the air for combustion. Thus, the turbocharger system effectively increases the power from each combustion cycle in the cylinder of the engine 14.

As indicated earlier, the turbocharger 12 uses the exhaust flow from the diesel engine 14 to spin the turbine 26 to achieve the compression of the inlet air. The turbocharger 12 is connected to the exhaust of the engine 14, and due to the high temperature of the exhaust gases of the engine 14, the turbine 26 temperature increases. The turbocharger 12 is mechanically coupled, for example, by bolting, to the exhaust manifold of the diesel engine 14. The exhaust from the cylinders of the diesel engine 14 spins the turbine. A turbocharger shaft connects the compressor 24 to the turbine 26. The compressor is located between the air filter (not shown in the figure) and the intake manifold 28 of the engine 14. The air pressurized by the compressor 24 is communicated to the cylinders of the engine 14 via the intake manifold. Exhaust from the cylinders routed through the exhaust manifolds 30 passes through the turbine, causing the turbine 26 to spin. On the other end of the turbocharger shaft 32, the compressor 24 drives air into the cylinders of the engine 14.

Figure 2:
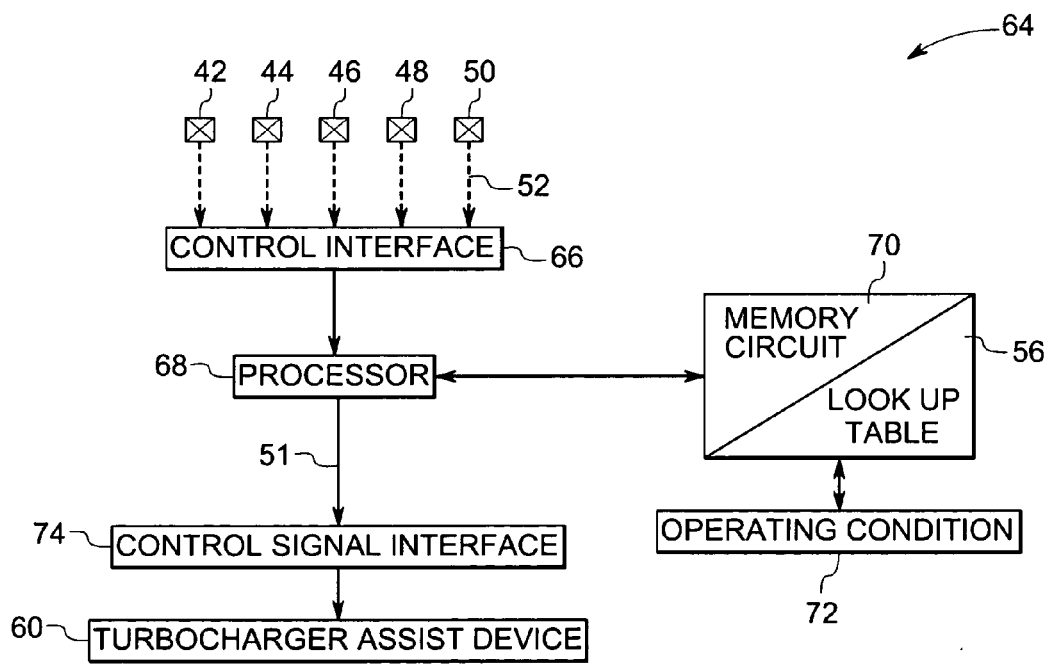
FIG. 2 is a schematic illustration of a control circuit for operating a turbocharger for a diesel engine, incorporating a turbocharger assist device in accordance with aspects of the present technique.

The turbocharging system 10 also includes a controller 40. In an exemplary embodiment, the controller 40 is an electronic logic controller that is programmable by a manufacturer, and that may permit additional programming by a user. The controller 40 receives various signals from the diesel engine 14 and the turbocharger 12 via a series of sensors 42-50 as illustrated in FIG. 2. Typically, the sensors 42–50 include a pressure sensor 42, a temperature sensor 44, a speed sensor 46, an ambient temperature sensor 48, and a mass flow rate sensor 50. However, in other embodiments of the present technique, various other sensors may be used to monitor different operating parameters of the diesel engine 14 and the turbocharger 12. Typically, the controller includes circuitry, such as a dedicated or multi-purpose processor, operable to generate control signals 51 in response to received signals 52 indicative of the compressor operating conditions. In the embodiment illustrated, the controller 40 in turn is coupled to, or itself includes, a memory device storing compressor map 54, a look up table 56, or both, from which the controller 40 obtains desired operating conditions and an operating mode of the turbocharger 12 based on the control signal, independent of the speed of the diesel engine 14. The control signals generated by the controller are applied to the turbocharger assist device 60, as described below, to regulate application of work to, or extraction of work from, the engine 14. The control circuitry thereby controls the operation of the turbocharger 12 and the diesel engine 14.

A turbocharger drive shaft 58 is coupled to a turbocharger assist device 60, which is further coupled to an electrical energy source such as the alternator output, a battery 62 or multiple sets of batteries used for initial start up of the turbocharger assist device 60. The turbocharger assist device 60 is an electric motor-generator for facilitating independent control of the turbocharger operation. However, other types of devices may also be used as a turbocharger assist device 60, such as hydraulic devices. The turbocharger assist device 60 is mechanically coupled to the turbocharger drive shaft 58 and the turbocharger assist device receives an electrical control signal from controller 40. The turbocharger assist device 60 is operable to supply work to the turbocharger drive shaft 58 (i.e. to apply torque to the shaft to drive it) or remove work from the turbocharger drive shaft 58 (i.e. to be driven by the shaft). The operation of the turbocharger assist device in either adding work to the turbocharger, or extracting work therefrom, defines, in the present context, two distinct operating modes.

During starting of the engine 14 in cold weather conditions, for example, the turbocharger assist device 60 is operated as a motor (i.e. in motor mode). In this mode, torque is supplied to the turbocharger drive shaft 58 in addition to torque supplied from the turbine 26, thereby increasing the turbocharger 12 input power, permitting compression of additional air, and/or at higher pressures for introduction into the cylinders of the diesel engine 14. Conversely, the turbocharger assist device 60 may be operated as a generator (i.e. in generator mode) during high-speed operation. When in generator mode, the turbocharger assist device 60 forms an additional load on the turbocharger drive shaft 32, which decreases the speed on the turbocharger shaft 32 and therefore decreases the power delivered to the compressor and reduces the amount of air and/or the pressure of the air available for introduction into the cylinders of the diesel engine 14 for combustion.

In a present implementation, a primary role of the turbocharger assist device 60 operating in generator mode is to avoid overspeeding and/or surging of the compressor 24. "Surge" is a phenomenon of compressors discussed below, and is generally to be avoided for proper operation. By reducing the pressure of compressed air being provided to the diesel engine 14, the turbocharger assist device 60 functions to reduce the maximum pressure in cylinder of the diesel engine 14. By operating in generator mode, the turbocharger 12 speed is reduced to control maximum speed below safe design limits while recovering useful energy in the process.

Referring to FIG. 2, a control circuit 64 is illustrated for operating a turbocharger 12 for a diesel engine 14, incorporating a turbocharger assist device 60. As indicated above, the controller 40 receives various signals 52 from the diesel engine 14 and the turbocharger 12 via a series of sensors 42–50. The signals from these sensors are transferred to a control interface 66, and the signals are further processed in a processor 68. The processor 68 may perform filtering operations and make certain computations based upon the received signals 52 and compares the processed signals or values with values stored in a memory circuit 70. As noted above, the memory circuit 70 may store a look up table 56 containing values representative of desired operation of the turbocharger assist device 60, cylinder pressures, or other desired operating conditions as a function of the processed signals or computed values. Based upon the comparison, then, the processor 68 generates control signals 51 for operation of the turbocharger assist device 60 to maintain or reach the desired operating conditions 72, including the operating mode of the turbocharger system in aid with the memory circuit 70 and the look up table 56. The resulting control signals 51 from the processor 68 are applied to the control signal interface 74 for application to the turbocharger assist device 60, thereby regulating operation of the system either to drive the turbocharger drive shaft 58, thereby driving the turbocharger 12, or to extract work from the turbocharger drive shaft 58, depending upon the desired operating mode.

Figure 3:
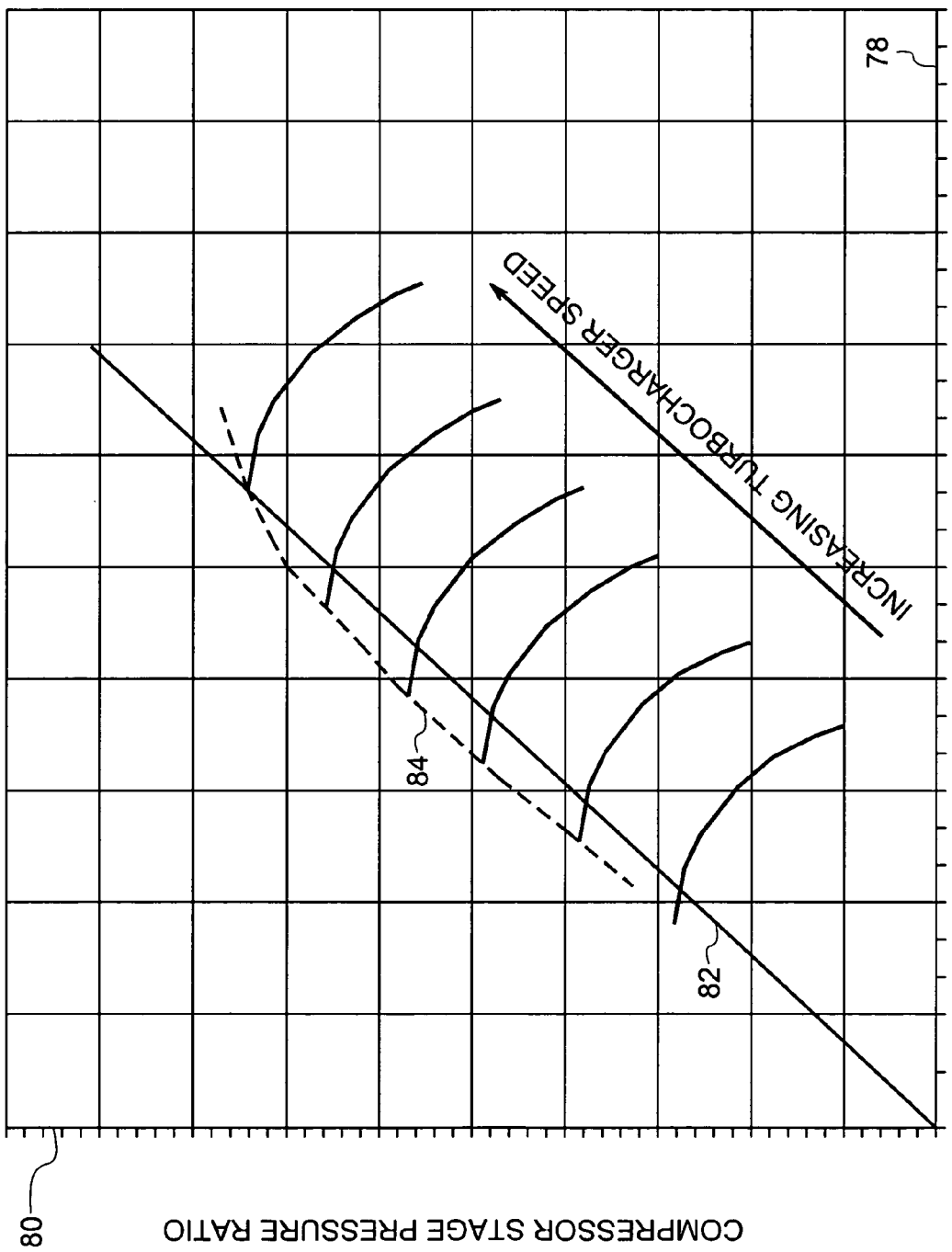
FIG. 3 is a graphical representation of a typical compressor map in accordance with aspects of the present technique.

Turning now to FIG. 3, a graphical representation of a typical compressor map 76 is illustrated. The map 76 is illustrated as a series of traces or curves in a coordinate system defined by a corrected mass flow rate axis 78 and a compressor stage pressure ratio axis 80. The compressor stage pressure ratio is defined as the ratio of the compressor outlet pressure to the compressor inlet pressure. The central line in the figure indicates an engine breathing line 82 at constant engine speed and the curve extending adjacent to the breathing line indicates the surge line 84. Compressors are driven to higher pressure ratios when any combination of the following occur; the ambient temperature is reduced, the ambient pressure is reduced, the engine fueling is increased or the fuel injection timing is retarded. However, unstable flow may develop in the compressor, which is called surge. Ultimately, if left unchecked, such surge can damage the turbocharger system, resulting in significant downtime and cost to repair.

As will be appreciated by those skilled in the art, such surge is the result of flow separation in the compressor. The surge line 84 represents this condition, while the breathing line 82 indicates the flow characteristic of a four-stroke engine operating at a constant speed, which extends generally along the surge line 84. A counterpart engine breathing characteristic curve for a two-stroke engine could also be used. To the right of this breathing line 82 the compressor works without surging.

During operation of the turbocharger assist device 60 in generator mode, the additional load of the turbocharger assist device 60 decreases the turbocharger speed, thereby avoiding surge (i.e. maintaining the operation of the turbocharger system to the right of the surge line). On the contrary, when the turbocharger assist device 60 functions in motor mode, the turbocharger speed is increased to generate higher flow, higher compressor outlet temperature and pressure, as would be useful to enhance cold start capability.

Figure 4:
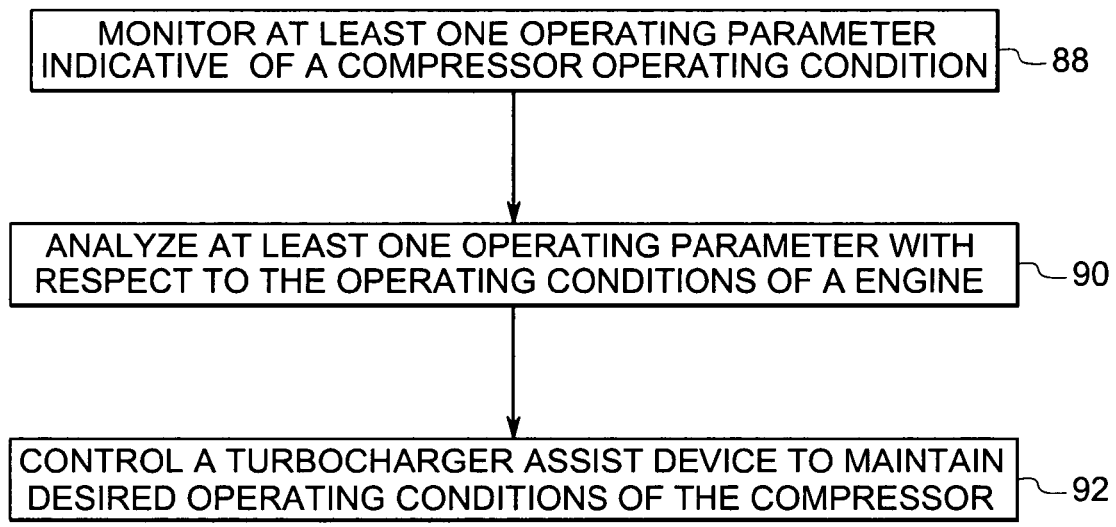
FIG. 4 is a flow diagram illustrating an exemplary method of operating a turbocharger in accordance with aspects of the present technique.

Referring to FIG. 4, a flow diagram is illustrated for an exemplary method of operating a turbocharger in accordance with embodiments of the present technique. The process begins with monitoring at least one operating parameter indicative of a compressor operating condition (step 88). The operating parameters may include at least one of compressor pressure ratio, manifold temperature, manifold pressure, turbocharger speed, ambient temperature and mass flow rate of air entering the engine. As will be appreciated by those skilled in the art, the compressor pressure ratio may be computed based on measuring the inlet and outlet pressures of the compressor, such as via conventional pressure sensors. The manifold temperature may be measured via a conventional thermocouple or resistive temperature detector disposed on or adjacent to the manifold. A conventional pressure sensor in the manifold may sense the manifold pressure. The engine and turbocharger speed is sensed by a suitable tachometer or other rotational frequency measurement device, while the ambient temperature is sensed by a suitable thermocouple or resistive device. Finally, the mass flow rate may be derived from a signal generated by a flow sensor. Certain or all of these signals may be available from sensors existing on the engine, or which may be added to the engine during manufacture or by retrofitting. Moreover, the signals may be transmitted to the turbocharger system control circuitry by dedicated conductors, or may be transmitted by appropriate network media and protocols, such as via a control area network (CAN) based network.

At step 90 the operating parameters selected for control of the turbocharger system are analyzed by the processing circuitry with respect to the target operating conditions of the engine. In a present embodiment, the operating conditions of the engine include the speed of the engine, the amount of air flowing in the cylinders of the engine, the temperature and the pressure of the intake manifold. The target or desired operating conditions may be stored in the form of a look up table. The table includes values for the desired operating parameters, and combinations of these parameters, along with settings for the turbocharger assist device. At step 92 the process controls a turbocharger assist device to maintain the desired operating conditions, particularly the conditions of the compressor. As explained above, the turbocharger assist device receives signals from the control circuitry and works either as a motor or a generator, depending upon the operating mode.

Figure 5:
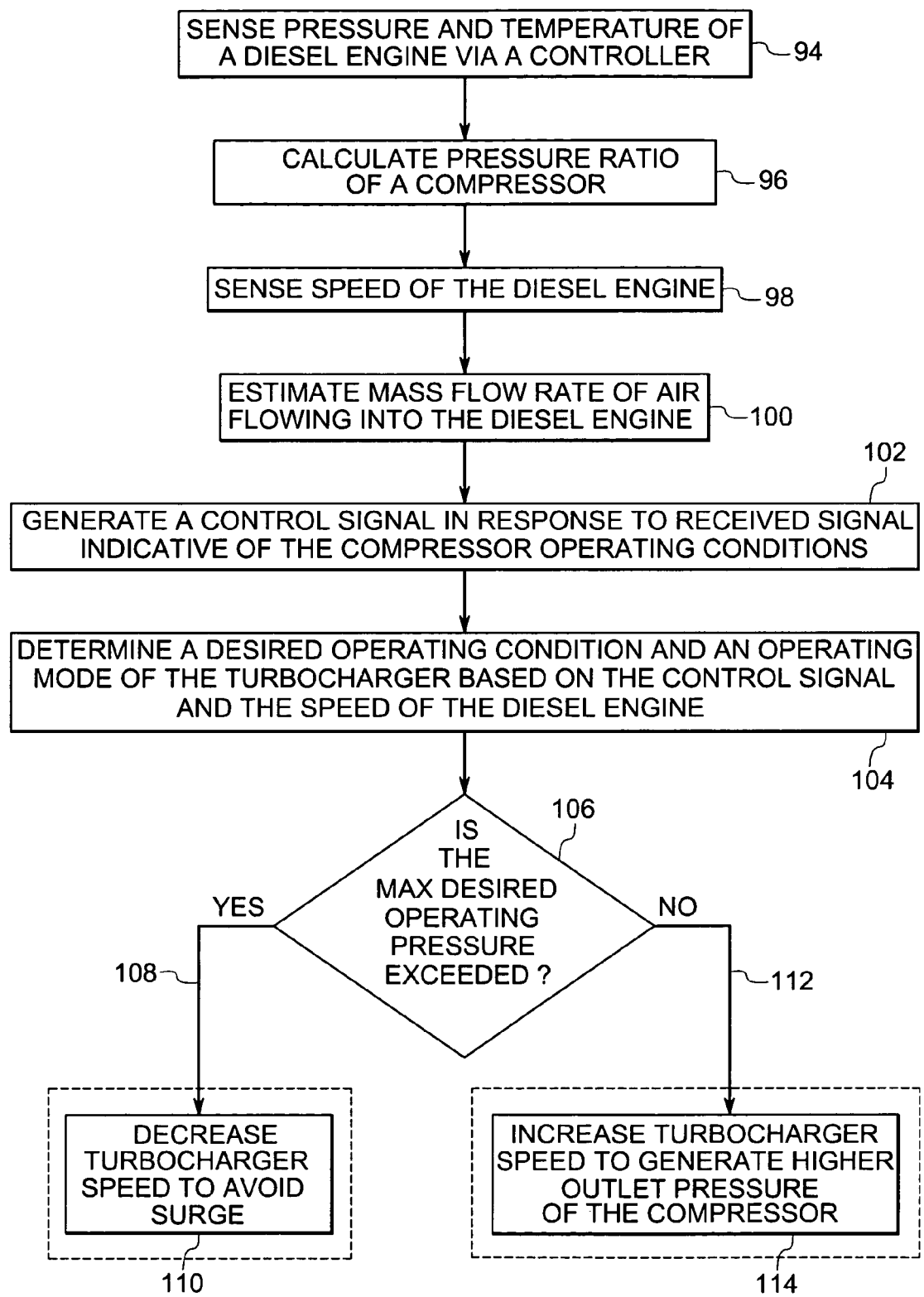
FIG. 5 is a flow diagram illustrating an exemplary method of operating a turbocharger assist device based on the signals received in the controller in accordance with aspects of the present technique.

FIG. 5 is a flow diagram illustrating an exemplary method of operating a turbocharger assist device based on the signals received in the controller in accordance with aspects of the present technique. The process starts by sensing pressure and temperature along with other desired operating parameters of the diesel engine via appropriate sensors, as discussed above, and as indicated by step 94. The signals are sensed through the sensors located in the engine as discussed above. In step 96 the pressure ratio across the compressor is computed, followed by sensing of speed of the diesel engine for determining the desired operating conditions of the turbocharger based on the operating parameters of the engine as represented by step 98. At step 100 the mass flow rate of the air flowing into the diesel engine is estimated. At step 102 the processor generates a control signal in response to received signals and based on a comparison of the actual operations conditions with the values of either a look-up table or a compressor map (of values tracing the surge relationships discussed above). At step 104 the processor determines a desired operating condition and an operating mode of the diesel engine. At this point, a decision is made to determine whether the maximum desired operating pressure has been exceeded, that is, the set pressure limit for smooth operation of the engine (step 106), and whether the operating pressure exceeds that of the desired state (step 108). The speed of the turbocharger may thus be reduced to avoid surge of compressor as indicated in step 110. On the other hand if the operating pressure is within the desired values or needs to be increased (step 112), the speed of the turbocharger is increased to generate higher flow of air for combustion in the engine and higher compressor outlet pressure as indicated in step 114.

As will be appreciated by those skilled in the art, the overall system offered by the present technique enables a variety of benefits over the conventional system. The turbocharger assist device coupled to the controller, is configured to add work to the turbocharger or subtract work from the turbocharger based on the control signal, obtained from the sensors present in the diesel engine, thereby providing improved cold start capability, active control over surge through the regulation of turbocharger speed, and elimination of turbocharger overspeed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a turbocharger for regulating operating conditions of a diesel engine comprising:
   monitoring at least one operating parameter indicative of a compressor operating condition;
   analyzing the at least one operating parameter with respect to the operating conditions of the diesel engine; and
   controlling a turbocharger assist device to maintain desired operating conditions of the compressor independent of engine speed;

wherein controlling comprises controlling the turbocharger assist device to generate electric power when an excess of energy exists in the exhaust of the engine to subtract work from the turbocharger.

2. The method of claim 1, wherein the operating condition is in the form of a lookup table.

3. The method of claim 1, wherein the turbocharger is controlled to increase or decrease the inlet air pressure to the engine.

4. The method of claim 1, further comprising operating the turbocharger assist device as a generator to subtract work from a turbocharger drive shaft.

5. The method of claim 1, further comprising operating the turbocharger assist device as a motor thereby increasing the speed of the turbocharger to generate higher flow of air into the engine.

6. The method of claim 1, wherein the operating parameter includes at least one of compressor pressure ratio computed based on inlet and outlet pressures of the compressor, manifold temperature, manifold pressure, turbocharger speed, ambient temperature and parameters indicative of mass flow rate of the air entering the engine.

7. The method of claim 1, wherein the operating condition is based upon surge data, compressor outlet pressure and compressor map data.

8. A method of operating a turbocharger for regulating operating conditions of a diesel engine comprising:
monitoring at least one operating parameter indicative of a compressor operating condition;
analyzing the at least one operating parameter with respect to the operating conditions of the diesel engine; and
controlling a turbocharger assist device to maintain desired operating conditions of the compressor independent of engine speed;
wherein controlling comprises controlling the turbocharger assist device to add work to the turbocharger unless the compressor approaches a surge condition.

9. A method of operating a turbocharger for a diesel engine comprising:
sensing pressure and temperature of the diesel engine;
calculating a pressure ratio of a compressor based upon the sensed pressure, wherein the pressure ratio is computed based on inlet and outlet pressures of the compressor;
sensing speed of the diesel engine;
estimating a mass flow rate of air flowing into the diesel engine;
determining a desired operating condition and an operating mode of the turbocharger based upon the sensed temperature, the calculated pressure ratio, the mass flow rate and the speed;
generating a control signal based upon the desired operating condition and the operating mode; and
applying the control signal to control a turbocharger assist device to maintain the desired operating condition;
selectively operating the turbocharger assist device to generate electric power when an excess of energy exists in an exhaust of the engine to subtract work from the turbocharger.

10. The method of claim 9, wherein the control signal is based upon surge data or a compressor map.

11. The method of claim 9, wherein the desired operating condition includes an engine pressure of the diesel engine.

12. The method of claim 9, wherein the turbocharger assist device is a motor-generator.

13. The method of claim 9, wherein the operating mode is a generator mode.

14. The method of claim 9, wherein the operating mode is a motor mode.

15. The method of claim 9, wherein the control circuit operates the turbocharger assist device in response to the engine speed, engine load, and turbocharger speed.

16. A method of operating a turbocharger for a diesel engine comprising:
sensing pressure and temperature of the diesel engine;
calculating a pressure ratio of a compressor based upon the sensed pressure;
wherein the pressure ratio is computed based on inlet and outlet pressures of the compressor;
sensing speed of the diesel engine;
estimating a mass flow rate of air flowing into the diesel engine;
determining a desired operating condition and an operating mode of the turbocharger based upon the sensed temperature, the calculated pressure ratio, the mass flow rate and the speed;
generating a control signal based upon the desired operating condition and the operating mode; and
applying the control signal to control a turbocharger assist device to maintain the desired operating condition;
controlling the turbocharger assist device to add work to the turbocharger unless the compressor approaches a surge condition.

17. An apparatus for regulating operating conditions of a diesel engine, the apparatus comprising:
a controller configured to receive signals representing at least one operating parameter of the diesel engine and to generate a control signal in response to the received signals;
a turbocharger including a turbine configured to be driven by exhaust gas from the engine, and a compressor coupled to the turbine and driven by the turbine to introduce air into the engine; and
a turbocharger assist device coupled to the controller, the compressor and the turbine, and configured to add work to a turbocharger drive shaft or subtract work from the turbocharger drive shaft based on the control signal independent of speed of the engine;
wherein the controller controls the turbocharger assist device to generate electric power when an excess of energy exists in the exhaust of the engine to subtract work from the turbocharger drive shaft.

18. The apparatus of claim 1, wherein the turbocharger is configured to regulate inlet air pressure of the engine.

19. The apparatus of claim 1, wherein the turbocharger assist device is a motor-generator.

20. The apparatus of claim 1, wherein the turbocharger assist device is adapted to operate as a generator thereby decreasing the speed of the turbocharger to avoid surge of the engine.

21. The apparatus of claim 1, wherein the turbocharger assist device is adapted to operate as a motor thereby increasing the speed of the turbocharger to generate higher flow of air into the engine.

22. The apparatus of claim 1, further comprising of a plurality of sensors adapted for sensing at least one of the operating parameters of the diesel engine.

23. The apparatus of claim 22, the plurality of sensors including a pressure sensor, a temperature sensor and a speed sensor.

24. The apparatus of claim 1, wherein the controller is configured to provide increased compressor outlet pressure and temperature during cold starting and acceleration of the engine.

25. The apparatus of claim 1, wherein the turbocharger is coupled to a heat exchanger, wherein, the heat exchanger is adapted to cool the compressed air from the compressor.

26. The apparatus of claim 1, wherein the at least one operating parameter includes at least one of compressor pressure ratio computed based on inlet and outlet pressures of the compressor, manifold temperature, manifold pressure, turbocharger speed, ambient temperature or mass flow rate of air entering the engine.

27. The apparatus of claim 1, wherein the control signal is based upon surge data, engine outlet temperature and a compressor map data.

28. The apparatus of claim 27, wherein the compressor map data is in the form of a look up table.

29. An apparatus for regulating operating conditions of a diesel engine, the apparatus comprising:

a controller configured to receive signals representing at least one operating parameter of the diesel engine and to generate a control signal in response to the received signals;

a turbocharger including a turbine configured to be driven by exhaust gas from the engine, and a compressor coupled to the turbine and driven by the turbine to introduce air into the engine; and a turbocharger assist device coupled to the controller, the compressor and the turbine, and configured to add work to a turbocharger drive shaft or subtract work from the turbocharger drive shaft based on the control signal independent of speed of the engine;

wherein the controller controls the turbocharger assist device to add work to the turbocharger drive shaft unless the compressor approaches a surge condition.

* * * * *